United States Patent [19]
Jones

[11] Patent Number: 5,859,642
[45] Date of Patent: *Jan. 12, 1999

[54] VIRTUAL BUTTON INTERFACE

[75] Inventor: Jake S. Jones, Albuquerque, N. Mex.

[73] Assignee: Sandia Corporation, Albuquerque, N. Mex.

[*] Notice: This patent issued on a continued prosecution application filed under 37 CFR 1.53(d), and is subject to the twenty year patent term provisions of 35 U.S.C. 154(a)(2).

[21] Appl. No.: 723,944

[22] Filed: Sep. 26, 1996

[51] Int. Cl.$^6$ .................................................. G06F 3/00
[52] U.S. Cl. .......................... 345/352; 345/357; 345/358; 345/156
[58] Field of Search ..................... 395/119, 348, 395/355, 127, 353; 345/158, 166, 163, 355, 327, 7, 8, 156, 419, 348, 427, 353

[56] References Cited

U.S. PATENT DOCUMENTS

| | | | |
|---|---|---|---|
| 4,698,625 | 10/1987 | McCaskil et al. | 345/157 |
| 5,305,429 | 4/1994 | Sato et al. | 395/119 |
| 5,367,614 | 11/1994 | Bisey | 395/119 |
| 5,446,834 | 8/1995 | Deering | 395/127 |
| 5,485,175 | 1/1996 | Suzuki | 395/353 |
| 5,524,194 | 6/1996 | Clanton, III et al. | 345/327 |
| 5,666,504 | 9/1997 | Crutcher | 345/355 |
| 5,689,619 | 11/1997 | Smyth | 345/156 X |
| 5,689,628 | 11/1997 | Robertson et al. | 345/355 |
| 5,715,384 | 2/1998 | Ohshima et al. | 395/128 |
| 5,717,414 | 2/1998 | Bergsneider et al. | 345/158 |

*Primary Examiner*—Raymond J. Bayerl
*Assistant Examiner*—Chadwick A. Jackson
*Attorney, Agent, or Firm*—V. Gerald Grafe

[57] ABSTRACT

An apparatus and method of issuing commands to a computer by a user interfacing with a virtual reality environment. To issue a command, the user directs gaze at a virtual button within the virtual reality environment, causing a perceptible change in the virtual button, which then sends a command corresponding to the virtual button to the computer, optionally after a confirming action is performed by the user, such as depressing a thumb switch.

21 Claims, 2 Drawing Sheets

VIRTUAL BUTTON INTERFACE

The Government has rights to this invention pursuant to Contract No. DE-AC04-94AL85000 awarded by the U.S. Department of Energy.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to methods and apparatuses permitting commands to be issued to a computer program presenting a virtual reality environment to users of the program through necessary hardware interfacing with the computer program.

Interacting with a computer using a virtual reality environment requires means to give commands to the computer. Standard methods, such as use of keyboard and/or mouse plus a pull-down menu, of giving commands to a computer application do not function well in, and are not suited for, a virtual reality system. Voice commands are useful, but they are at present limited to only simple suites of commands because of the heavy computational power required for voice word recognition. Voice commands also require the user to memorize the exact phrasing of each command.

The present invention allows the programmer to easily create a collection of virtual buttons and menus in a virtual reality environment and the user to select commands by looking at a virtual button.

Perhaps the closest art is provided by the "haptic button", wherein the user inserts his or her hand in a device which simulates the tactile sensations which would be caused if the hand contacted a real object corresponding to an object in the virtual reality environment. Buttons can be simulated thereby and depressed by tactile push. The problem with this means is that it is also computationally expensive and requires an additional device which is expensive and prevents both hands from being free for manipulation of objects outside the virtual reality environment.

SUMMARY OF THE INVENTION

The present invention is of an apparatus for and method of issuing commands to a computer by a user interfacing with a virtual reality environment, comprising: detecting direction of gaze within the virtual reality environment; determining whether the direction of gaze intersects a button; causing a perceptible change in the button; and sending a command corresponding to the button to the computer. The preferred embodiment also provides a confirming signal, preferably causing another perceptible change in the button. The confirming signal can be depressing a switch, releasing a switch, manipulating a foot pedal, giving a voice command, depressing a key, waiting for a predetermined period, manipulating a touch pad, or manipulating a mouse. A panel of buttons can be employed, which preferably moves with the user in the virtual reality environment, and for which a set of commands corresponding to the buttons of the panel changes according to a predetermined hierarchy of commands and having at least one button with a corresponding command which changes the panel of buttons to correspond to a set of commands within the hierarchy different than a current set of commands. A head-tracking device is preferably employed to detect direction of gaze. The perceptible changes in buttons preferably is of color, shape, or size, or a combination thereof The present invention provides a quick and straightforward means of issuing commands to a computer. A primary advantage of the present invention is that selection of command buttons is done simply by looking at the button.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

The present invention provides a method and apparatus permitting commands to be given by a user to a computer in a virtual reality environment. Commands can be issued through virtual buttons (or objects in the virtual reality environment functioning as virtual buttons) activated simply by a user manipulating hardware to "look at" a virtual button (such as using a Fakespace head-tracking device to direct the gaze at a virtual button). Alternatively, the command issuance can require the user first to look at the virtual button and then perform a second action while looking at the virtual button, such as stating a voice command into a microphone (e.g., "Go!"), pressing a switch, or the like.

For purposes of the specification and claims, "virtual button" means a simulated object having at least two states: "raised" and "pushed", the latter indicating that a command is being issued to a computer. The virtual buttons of the invention can also have a third state, "highlighted", which indicates that the virtual button can be pushed by taking a predetermined action (or one of a set of predetermined actions). A virtual button is highlighted by directing a user's gaze, in a virtual reality environment, on the virtual button. "Detecting direction of gaze" is defined as sensing either a point at which vision focus is directed or at which the face as a whole is directed (i.e., where the vision focus would be directed if the user was looking straight ahead).

In a system according to the present invention, the user begins in a virtual reality environment (provided by hardware and software now well known in the art) having a head-tracking device (such as those provided by Fakespace) that updates the visual display according to head position, among other factors. For instance, if the user wants to view what is to the right in the virtual reality environment, the user simply turns his head to the right and the display changes to whatever should be seen in that direction.

Figure 1:
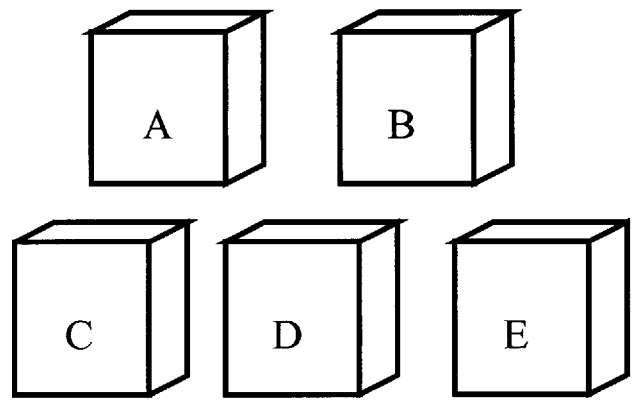
FIG. 1 illustrates the panel of buttons of the present invention in the virtual reality environment, with no button highlighted.
Figure 2:
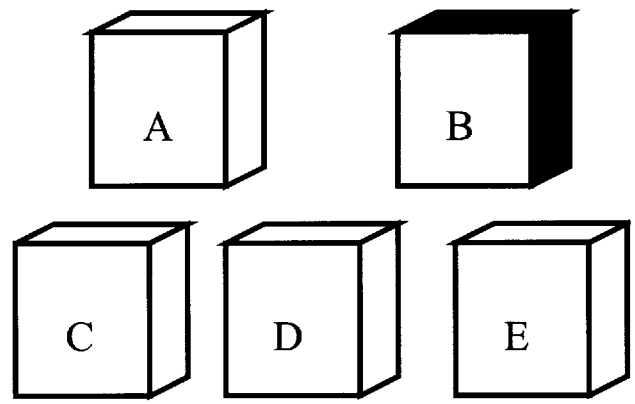
FIG. 2 illustrates the panel of buttons of the present invention with a button highlighted to show that it is being looked at by the user.
Figure 3:
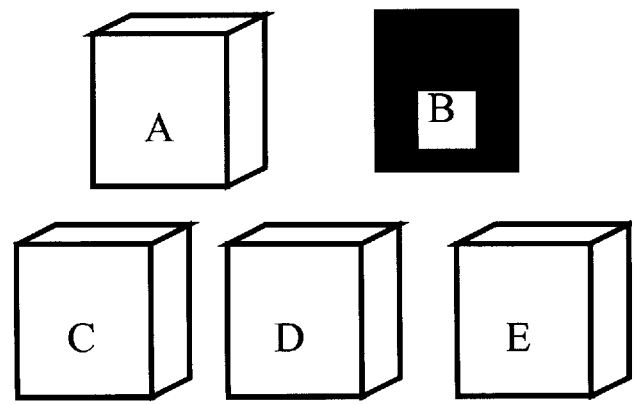
FIG. 3 illustrates the panel of buttons of the present invention with a button made opaque to indicate that the button has been activated by the user.

A virtual button interface according to the present invention can be seen as a panel of virtual buttons that either remains fixed or moves with the user. The panel can be below and forward of the user's simulated body position, like a car's dashboard. The panel is preferably transparent, so that vision is never occluded. FIG. 1 illustrates the panel with all virtual buttons in the raised state (i.e., not highlighted or pushed). To issue a command, the user first simply looks at a virtual button, which is then given a new color, shape, or size (or some other perceptible change) to show that it is in the highlighted state. In one embodiment, this would immediately issue a command associated with that virtual button, perhaps after a period of delay (e.g., two seconds). Preferably, however, the user gives a signal (preferably the same for all buttons, or the same group for all buttons) to push the virtual button and thereby cause the command associated with the virtual button to be issued to the computer. Some examples of such a signal are: (1) a simple voice command, e.g., "press"; (2) the pressing of a foot pedal located under the user's desk; and (3) the pressing of a thumb switch on the head-tracking device. Referring to FIG. 3, when the virtual button is in the pushed state, the virtual button display preferably changes again (new color, shape, size, or some other perceptible change) to show this state. The corresponding command is then executed by the computer.

The virtual button panel is preferably changeable by the user during operation, so that a potentially unlimited hierarchy of commands is accessible to the user. For instance, pushing one virtual button can cause another panel to appear with more virtual buttons mapped to other computer functions, or the pushing of a virtual button could cause the present virtual buttons to be changed to completely different functions. As can readily be understood, the virtual button interface can be used to change the labels on virtual buttons or to create completely new virtual button panels.

Figure 4:
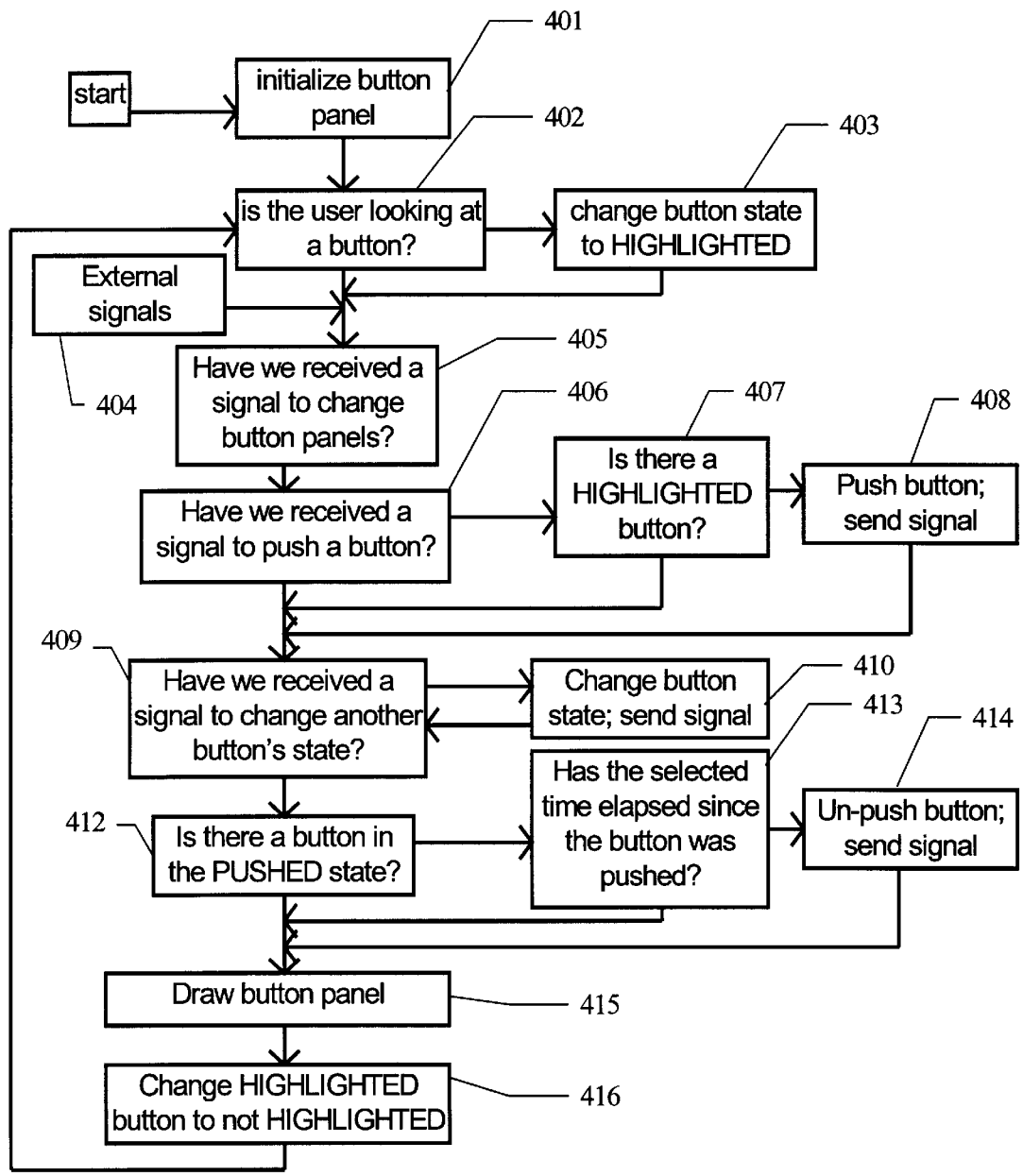
FIG. 4 is a flowchart illustrating the principal steps of one embodiment of the method of the invention.

FIG. 4 provides a flowchart of one embodiment of the invention, and is readily understandable to one of ordinary skill in the art. The virtual button interface controls a button panel, and can also send signals to other systems to control their action, and can receive signals from other systems that can affect the virtual button interface's actions. Each virtual button on the virtual button panel has several associated states, representing the current status of the virtual button. The virtual button panel is first initialized 401. If a user is looking at a virtual button 402 then the virtual button's state is changed to HIGHLIGHTED 403. External signals can also control the operation of the virtual button interface 404. For example, selected events in a simulation might cause selected controls to appears as virtual buttons. If a signal indicates that the virtual button panel is to be changed 405, then the new virtual button panel must be initialized 401. If the virtual button panel is not to be changed, then the virtual button interface checks whether a signal indicates to push a virtual button 406. If it does, then, if there is a HIGHLIGHTED virtual button 407, the virtual button is pushed and an appropriate signal sent 408. If there is no HIGHLIGHTED virtual button 407, then the signal to push a virtual button causes no change. If a signal has been received that indicates that a virtual button's state is to be changed 409, then the virtual button interface changes the state of that virtual button 410. If there is a virtual button in the PUSHED state 412, then the virtual button interface waits a selected amount of time 413 before it un-pushes the virtual button and sends an appropriate signal 414. After the actions discussed, the virtual button interface redraws the current virtual button panel 415, changes the HIGHLIGHTED virtual button state to RAISED (i.e., not PUSHED or HIGHLIGHTED) 416, and checks again for the user looking at a virtual button 402.

A system such as that described in Creve Maples, "Multidimensional, User-Oriented Synthetic Environment A Functionally Based, Human-Computer Interface" in The International Journal of Virtual Reality, Vol 1, Number 1 (Winter 1995), was utilized to test the present invention. Software implementing the functions illustrated by FIG. 4 was linked into the system. The resulting system operated as described above in the Detailed Description of the Invention.

The preceding example can be repeated with similar success by substituting the generically or specifically described reactants and/or operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

I claim:

1. A method of issuing commands to a computer by a user interfacing with a virtual reality environment, the method comprising the steps of:

a) detecting direction of gaze within the virtual reality environment, wherein detecting direction of gaze comprises detecting a point of focus within a displayable portion of the virtual reality environment;

b) determining whether the direction of gaze intersects a virtual button;

c) causing a perceptible change in the virtual button; and d) sending a command corresponding to the virtual button to the computer.

2. The method of claim 1 additionally comprising the step of providing a confirming signal.

3. The method of claim 2 additionally comprising the step of causing another perceptible change in the virtual button.

4. The method of claim 2 wherein the step of providing a confirming signal comprises providing a signal selected from the group consisting of depressing a switch, releasing a switch, manipulating a foot pedal, giving a voice command, depressing a key, waiting for a predetermined period, manipulating a touch pad, and manipulating a mouse.

5. The method of claim 1 additionally comprising the step of providing a panel of virtual buttons to the virtual reality environment.

6. The method of claim 5 wherein the step of providing a panel of virtual buttons comprises providing a panel of virtual buttons that moves with the user in the virtual reality environment.

7. The method of claim 5 wherein the step of providing a panel of virtual buttons comprises providing a panel of virtual buttons for which a set of commands corresponding to the virtual buttons of the panel changes according to a predetermined hierarchy of commands.

8. The method of claim 7 wherein providing a panel of virtual buttons for which a set of commands corresponding to the virtual buttons of the panel changes according to a predetermined hierarchy of commands comprises providing at least one virtual button with a corresponding command which changes the panel of virtual buttons to correspond to a set of commands within the hierarchy different than a current set of commands.

9. The method of claim 1 wherein the step of detecting direction of gaze comprises detecting direction of gaze by means of head-tracking device.

10. The method of claim 1 wherein the step of causing a perceptible change comprises causing a change selected from the group consisting of color, shape, size, and combinations thereof.

11. An apparatus for issuing commands to a computer by a user interfacing with a virtual reality environment, comprising: means for detecting direction of gaze within the virtual reality environment; means for determining whether the direction of gaze intersects a virtual button; means for causing a perceptible change in the virtual button; and means for sending a command corresponding to the virtual button to the computer.

12. The apparatus of claim 11 additionally comprising means for providing a confirming signal.

13. The apparatus of claim 12 additionally comprising means for causing another perceptible change in the virtual button.

14. The apparatus of claim 12 wherein said means for providing a confirming signal comprises means for providing a signal selected from the group consisting of a switch, a foot pedal, a voice command receptor, a key, a timer, a touch pad, and a mouse.

15. The apparatus of claim 11 additionally comprising means for providing a panel of buttons to the virtual reality environment.

16. The apparatus of claim 15 wherein said means for providing a panel of buttons comprises means for providing a panel of buttons that moves with the user in the virtual reality environment.

17. The apparatus of claim 15 wherein said means for providing a panel of buttons comprises means for providing a panel of buttons for which a set of commands corresponding to the buttons of the panel changes according to a predetermined hierarchy of commands.

18. The apparatus of claim 17 wherein said means for providing a panel of virtual buttons for which a set of commands corresponding to the virtual buttons of the panel changes according to a predetermined hierarchy of commands comprises means for providing at least one virtual button with a corresponding command which changes the panel of virtual buttons to correspond to a set of commands within the hierarchy different than a current set of commands.

19. The apparatus of claim 11 wherein said means for detecting direction of gaze comprises a head-tracking device.

20. The apparatus of claim 11 wherein said means for causing a perceptible change comprises means for causing a change selected from the group consisting of color, shape, size, and combinations thereof.

21. A method of issuing commands to a computer by a user interfacing with an immersive virtual reality environment, the method comprising the steps of:

a) detecting direction of gaze within the immersive virtual reality environment, wherein detecting direction of gaze comprises detecting a point of focus within a displayable portion of the immersive virtual reality environment;

b) determining whether the direction of gaze intersects a virtual button;

c) causing a perceptible change in the virtual button; and d) sending a command corresponding to the virtual button to the computer.

* * * * *